(12) United States Patent
Asai et al.

(10) Patent No.: US 6,651,782 B2
(45) Date of Patent: Nov. 25, 2003

(54) BRAKE CABLE CONNECTING APPARATUS FOR DRUM BRAKE

(75) Inventors: Seiji Asai, Okazaki (JP); Junichi Ohnishi, Nagoya (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 09/859,815

(22) Filed: May 18, 2001

(65) Prior Publication Data

US 2002/0007990 A1 Jan. 24, 2002

(30) Foreign Application Priority Data

May 18, 2000 (JP) ........................................ 2000-146741

(51) Int. Cl.$^7$ ................................................ B60T 1/00
(52) U.S. Cl. .................................... 188/2 D; 188/106 A
(58) Field of Search .............................. 188/2 D, 106 F, 188/106 A, 106 P

(56) References Cited

U.S. PATENT DOCUMENTS

| | | | | |
|---|---|---|---|---|
| 3,661,233 A | * | 5/1972 | Margetts et al. ......... | 188/106 A |
| 4,310,064 A | * | 1/1982 | Kazarian, Jr. .............. | 180/271 |
| 4,753,325 A | * | 6/1988 | Jaksic .................... | 188/106 A |
| 4,872,533 A | * | 10/1989 | Boyer et al. ............. | 188/106 A |
| 4,886,134 A | * | 12/1989 | Yamamoto .............. | 188/106 A |
| 4,886,146 A | * | 12/1989 | Copp .................... | 188/106 A |
| 4,930,605 A | * | 6/1990 | Boyer et al. ............. | 188/106 A |
| 4,955,458 A | * | 9/1990 | Shellhause .............. | 188/106 A |
| 5,002,159 A | * | 3/1991 | Brix et al. .............. | 188/106 A |
| 5,092,428 A | | 3/1992 | Kobayashi et al. | |
| 5,137,120 A | * | 8/1992 | Barbosa .................. | 188/106 A |
| 5,142,935 A | * | 9/1992 | Carr .......................... | 74/502.4 |
| 5,377,789 A | * | 1/1995 | Brooks et al. .......... | 188/106 A |
| 5,706,914 A | * | 1/1998 | Goldstein .................. | 188/2 D |
| 6,105,732 A | * | 8/2000 | Venetos ........................ | 188/20 |
| 6,241,051 B1 | * | 6/2001 | Ohnishi et al. ......... | 188/106 A |
| 6,435,317 B2 | * | 8/2002 | Tanaka et al. .............. | 188/2 D |
| 6,502,670 B1 | * | 1/2003 | Asai .......................... | 188/2 D |

FOREIGN PATENT DOCUMENTS

| | | |
|---|---|---|
| JP | A 10-220506 | 8/1998 |
| WO | WO 98/40640 | 9/1998 |

* cited by examiner

*Primary Examiner*—Jack Lavinder
*Assistant Examiner*—Benjamin A Pezzlo
(74) *Attorney, Agent, or Firm*—Apex Juris, pllc; Tracy M. Heims

(57) ABSTRACT

A brake cable connecting apparatus having a cable end insertion groove 120a formed by U-like folding the free end of a brake lever 120 on one of brake shoes 1, 2 and a guiding member 150 provided onto the cable end insertion groove 120a. The guiding member 150 tends to move toward the bottom of the insertion groove 120a by a coil spring 160. When the cable end 142 is advanced in the insertion groove 120a, the guiding member 150 moves upward, passage of the cable end 142 is permitted by displacement of the guiding member 150 in a direction away from the bottom of the insertion groove 120a, then the guiding member 150 immediately moves downward, thereby engaging a backward surface of the cable end 142; therefore, restricting the cable end 142 from coming off.

8 Claims, 15 Drawing Sheets

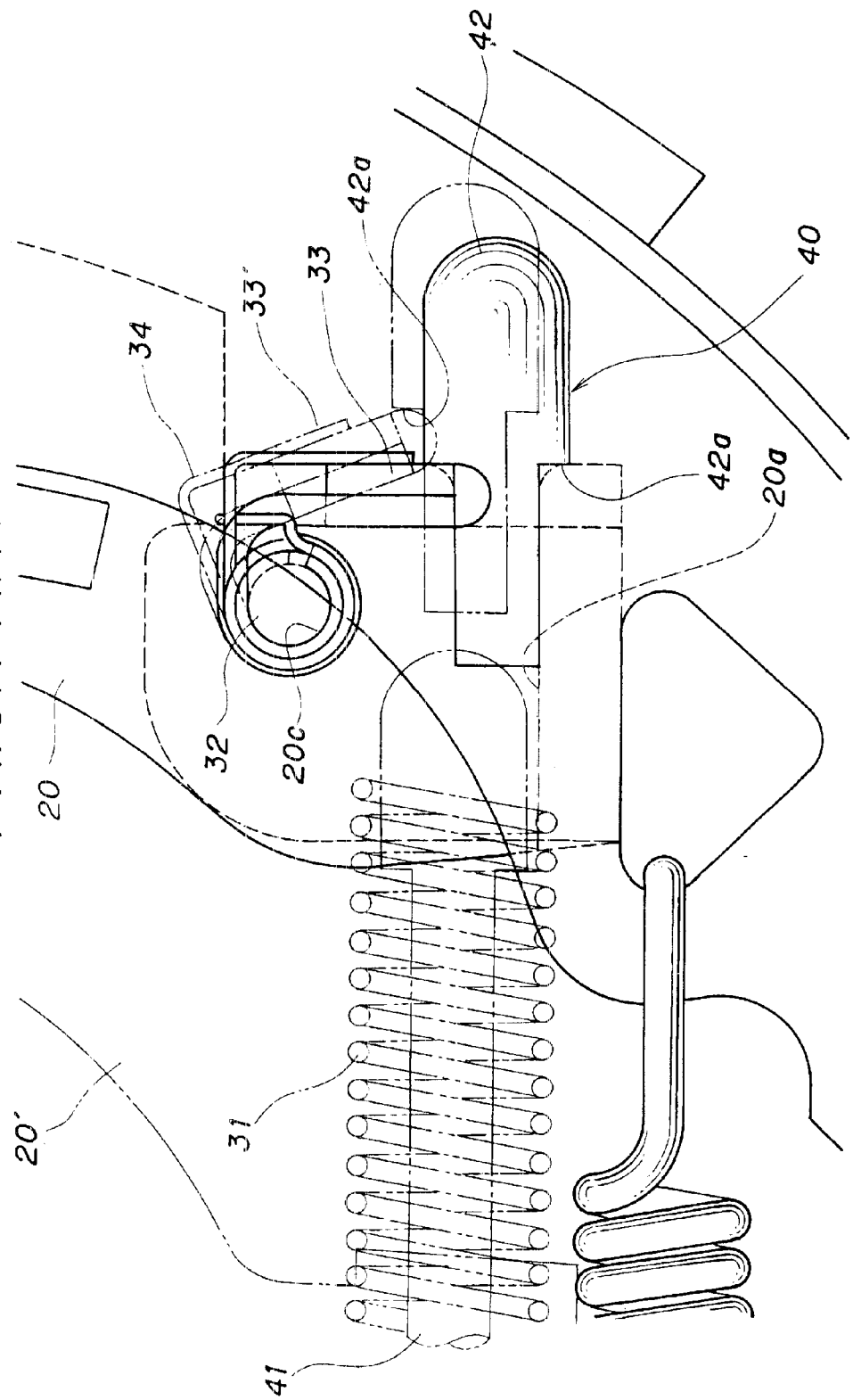

BRAKE CABLE CONNECTING APPARATUS FOR DRUM BRAKE

FIELD OF INVENTION

This invention relates to a drum brake, such as a parking brake, that is operated by a brake cable; more specifically, it relates to a brake cable connecting apparatus for connecting a brake cable to a brake lever provided in the drum brake.

DESCRIPTION OF PRIOR ART

As a conventional brake cable connecting apparatus for a drum brake, a forward-pull type parking brake apparatus is well-known in the art and consists of a brake lever pivotally supported on a shoe web of a brake shoe at a base portion thereof and a brake cable connected on a free end of the brake lever.

One type of brake cable, for remotely pulling and operating the brake lever, mainly consists of an inner cable, a cable end fixed on a tip end of the inner cable and an outer casing. There is the other type of brake cable without the outer casing, in case of either type of brake cable whether the outer casing is included or not, the term "cable" is designated to the part that corresponds to the inner cable in the present specification.

An U-shaped cable-receiving groove is formed at a free end of the brake lever. One end of the cable is connected to a brake operating means such as a hand brake lever in the cabin, and the other or a tip end of the cable penetrates through a back plate and is received in the cable-receiving groove, the cable end securely fixed on the tip end of the cable is engaging with an end edge of the cable receiving groove on the side of a cable releasing direction, thereby preventing the cable from coming off from the cable receiving groove. Actuating the brake operating means such as the hand brake lever for remotely pulling the cable causes the brake lever into rotation and urges the brake shoes to separate apart from each other to effect the parking braking.

Before fixing the brake onto the vehicle, this type of drum brake with the pre-assembled cable causes a drawback by increasing the required stock and transportation space and leaves a potential problem of unexpected damage to the cable during stocking and transportation. Therefore it is preferable that the cable does not connect to the drum brake in the process of drum brake assembly sub-step but in the process of vehicle assembly step.

One idea of a brake cable connecting apparatus, displaying a function of inserting a cable from outside into a drum brake and precisely receiving that cable in a brake cable-receiving groove and further snapping a cable end automatically on an edge surface of the groove at the side of the cable releasing direction, is disclosed in U.S. Pat. No. 5,002,159.

However, the above-described prior art of the brake cable connecting apparatus presents the possibility that the cable end happens to be disengaged from the brake lever if the cable slacks or returns to the initial position earlier than the brake lever when the parking brake is released. As such, an improved brake cable connecting apparatus to overcome such a problem is disclosed as an example shown in FIGS. 16–18 of WO98/40640 Patent Application.

FIG. 16 is a plan view of a leading-trading type (LT type) drum brake (drum brake assembly); FIG. 17 is an enlarged view of a connecting area of a brake cable when seen from arrow A in FIG. 16; and FIG. 18 is a partially enlarged plan view of a connecting area of the brake cable illustrating in FIG. 16.

A pair of brake shoes 1, 2, having an identically structure, are symmetrically disposed on the right and left in FIG. 16 and comprised of the following elements: semicircular shoe webs 1a, 2a; shoe rims 1b, 2b secured to form a T-shape in cross section; and, linings 1c, 2c fixed on a circumferential surface of the shoe rims 1b, 2b, respectively. With shoe holding mechanisms 3, 4, the brake shoes 1, 2 are resiliently mounted on a back plate 11, only a center hole and an opening 11a are shown in the figure with a one dash chain line and a broken line, and lower adjacent ends thereof abut on and engage with an anchor member and are restricted from lifting by a retaining plate 5.

Upper adjacent ends of the brake shoes 1, 2 operationally engage with a pair of left and right pistons of a wheel cylinder 6, respectively. An upper return spring 8 and a lower return spring 9 are stretched between a pair of brake shoes 1, 2 to urge the brake shoes 1, 2 in the retract direction. A brake lever 20 is superposed on the shoe web 1a of one brake shoe 1 and a base portion thereof is pivotally supported on the shoe web 1a with a pin 10. The brake lever 20 is able to rotate with the pin 10 from a position illustrated by a solid line to a position 20' illustrated by a one-dash chain line in a clockwise direction. A strut 7 provided between the pair of brake shoes 1, 2 restrict return positions of the brake shoes 1, 2 with actions of both return springs 8, 9 by abutting one end thereof on the brake lever 20 provided on one brake shoe 1 and the other end thereof on the other brake shoe 2.

A tongue like piece 20b, formed on the brake lever 20 by partial-shearing, functions as a stopper by abutting on an edged surface closer to the brake center of the shoe web 1a.

An opening 11a is pierced at the lower left side of the back plate 11 in FIG. 16, and a short conducting pipe 11b is fixed to the opening 11a. A coil spring 31 is compressed from an end of the conducting pipe 11b in the brake to a U-shaped cable end insertion groove 20a formed at a free end of the brake lever 20 by bending. The coil spring 31 urges the brake lever 20 into an initial position illustrated as a solid line and functions as a biasing means to orient the cable end 42 toward the cable end insertion groove 20a upon connecting the brake cable 40 to the brake lever 20.

As shown in FIG. 17, openings 20c is pierced on both side walls of the cable end insertion groove 20a of the brake lever 20 and one end of an L-shaped flap 33 is rotationally attached around a shaft 32 fit into both openings 20c.

A clockwise rotation of the flap 33 is restricted by abutting a free end thereof against a backward surface (at the side of a cable releasing direction) of the cable end insertion groove 20a as illustrated by a solid line in FIG. 18, while counterclockwise rotation thereof is permitted. A torsion spring 34 wound on the shaft 32 acts on the flap 33 toward the position illustrated as a solid line in FIG. 18; therefore the flap 33 usually covers the cable end insertion groove 20a. Consequently, the flap 33 is only rotated when an external force is added to the flap 33 against the application force of the torsion spring 34. A cable insertion recess 33a is formed at the tip end of the free end of the flap 33.

The brake cable 40 consisted of a cable 41 and a cable end 42 securely fixed to an end of the cable 41. The cable end 42 has a larger diameter than that of the cable 41 and is a bullet-shape at the tip end. The brake cable connecting procedure of the brake cable 40 onto the brake lever 20 will be explained bellow.

The cable end 42 of the brake cable 40, inserted into the opening 11a, passes through the conducting pipe 11=i a =1 and reaches the cable end insertion groove 20a while being conducted along by the coil spring 31. Furthermore, the cable end 42 advances inside the cable end insertion groove 20a and pushes the free end of the flap 33, which then is made to rotate and lift the flap 33 in the counterclockwise direction. If the flap 33 rotates to a position 33' illustrated as a broken line in FIG. 18, the tip end of the flap 33 falls down along a stepped surface 42a of the cable end 42 at a behind end by the resilient force of the torsion spring 34, thereby retracting to the initial position shown the solid line. At the same time, the small stem at the backward half of the cable end 42 is sandwiched between the cable insertion recess 33a of the flap 33 and the bottom of the cable end insertion groove 20a of the brake lever 20 while the stepped surface 42a abuts on and latches with the end surface at the side of the cable releasing direction; therefore, a potential for disengaging the cable end 42 from the cable end insertion groove 20a is restricted if the cable 41 is loosen.

The above-described cable end connecting structure suffers from the following drawbacks and deficiencies.

First, the shaft 32 functioning as a rotation axis of the flap 33 must be installed at a precise position on the brake lever 20 in relation to the cable end insertion groove 20a. Therefore, it is necessary to machine the hole 20c, thereby increasing manufacturing costs.

Secondly, to latch the flap 33 into the stepped portion 42a of the cable end 42, the cable end 42 must advance to the position, illustrated with the broken line, further than that of the normal engaging position illustrated with the solid line in FIG. 18. It is possibility that the cable end 42 might be clamped between the brake lever 20 and an inside surface of the shoe rim 1b, which requires the improved configuration, thereby restricting the design freedom thereof.

Thirdly, to implement the above-described automatic connecting the cable end 42 on the brake lever 20, the conducting pipe 11b and the coil spring 31, conducting the cable end 42 to the end portion of the brake lever 20, must be pre-attached before installing the brake cable 40 to the drum brake, thereby increasing time required to assemble.

SUMMARY AND OBJECT OF INVENTION

The present invention proposes to resolve such problems. It is an object of the present invention to provide a brake cable connecting apparatus without a machining process for ensuring manufacturing (dimensional) accuracy, a necessity of excessive displacement of the cable end 42 further than that of the engaging position, nor an additional effort to assemble the brake.

To attain the above-described object, this invention relates to a drum brake where;

A brake cable connecting apparatus for a drum brake, the apparatus comprising a brake lever for separating the brake shoes apart, the brake lever having a cable end insertion groove for permitting a cable end of a brake cable to pass through, the cable end insertion groove being defined by a lever body and a folded wall at a free end thereof, a guiding means for guiding a the cable end from an entrance of the cable end insertion groove to a position crossing an exit thereof so as to automatically latch the cable end on the brake lever, and a biasing means for flexibly biasing the brake cable inserted from outside of the drum brake toward the free end of the brake lever while deflecting the brake cable. The brake cable connecting apparatus being characterized in that the guiding means is provided between the lever body and the folded wall of the brake lever in a direction toward an opening of the cable end insertion groove adjacent to a tip end of the folded wall or a cross-direction of the brake cable, upon the cable end being fed in a space surrounded by the cable end insertion groove and the guiding means, the guiding means slidably moves in the direction away from a bottom of the cable end insertion groove against an application force of a resilient means so as to permit the cable end from passing through the cable end insertion groove and reach the end surfaces of the guiding means and cable end insertion groove at a cable releasing direction side and characterized in that the guiding means automatically returns by the action of the resilient means to a rest position so as to latch a backward surface of the cable end with the end surfaces of the cable end insertion groove and the guiding means at a side of a cable releasing direction or an exit side of the cable end insertion groove, thereby causing the brake cable to disengage from the brake lever.

This invention is combined with either: an engaging projection formed on the guiding means at the side of the cable releasing direction abutting an end surface of the brake lever at the side of the cable releasing direction; a leading slope for leading the cable end formed on the guiding means at the side of the cable pulling direction; or a leading slope for leading the cable end formed on the cable end insertion groove of the brake lever at the side of the cable pulling direction.

Furthermore, it is combined with: a brake cable including a coil spring wound around the cable thereof and compressed against the cable end; the cable end insertion groove at the side of the cable pulling direction formed to permit the cable end to pass through but obstructing the coil spring from passing through; or the bottom of the cable end insertion groove at the side of the cable releasing direction formed to permit the cable to pass through but obstructing the cable end from passing through; or the biasing means formed as a tail extending from a retaining plate restricting the lifting of the brake shoes; or the biasing means supported by the back plate and a space for guiding the brake cable is formed by the tail and the back plate.

BRIEF DESCRIPTION OF THE DRAWINGS

The above and other objects and advantages of the present invention will become readily apparent by reference to the following detailed description when considered in conjunction with the accompanying drawings.

FIG. 4(a) is showing a condition where the cable end is just abutting against the guiding member;

FIG. 4(b) is showing a condition where the cable end is passing through the brake lever while displacing the guiding member;

FIG. 4(c) is showing a condition where the cable end engages with a surface in the cable releasing direction side after completely passing the cable end through;

FIG. 6(*a*) is a longitudinal section view;

FIG. 6(*b*) is a left side view of FIG. 6(*a*);

FIG. 6(*c*) is a right side view of FIG. 6(*a*);

FIG. 6(*d*) is a cross section view of FIG. 6(*a*);

FIG. 7(*a*) is a view corresponding to FIG. 6(*a*);

FIG. 7(*b*) is a view corresponding to FIG. 6(*d*);

FIG. 12(*a*) is a longitudinal section view;

FIG. 12(*b*) is a left side view of FIG. 12(*a*);

FIG. 12(*c*) is a right side view of FIG. 12(*a*);

FIG. 12(*d*) is a cross section view of FIG. 12(*a*);

FIG. 13(*a*) is a view corresponding to FIG. 12(*a*);

FIG. 13(*b*) is a view corresponding to FIG. 12(*d*);

FIG. 14(*a*) is a view corresponding to FIG. 12(*a*);

FIG. 14(*b*) is a view corresponding to FIG. 12(*d*);

FIG. 15(*a*) is a view corresponding to FIG. 12(*a*);

FIG. 15(*b*) is a view corresponding to FIG. 12(*d*);

FIG. 18 is an enlarged detailed view of the brake cable connecting apparatus of FIG. 16.

DETAILED DESCRIPTION OF PREFERRED EMBODIMENT

Embodiments of this invention are explained with reference to the following figures.

Figure 1:
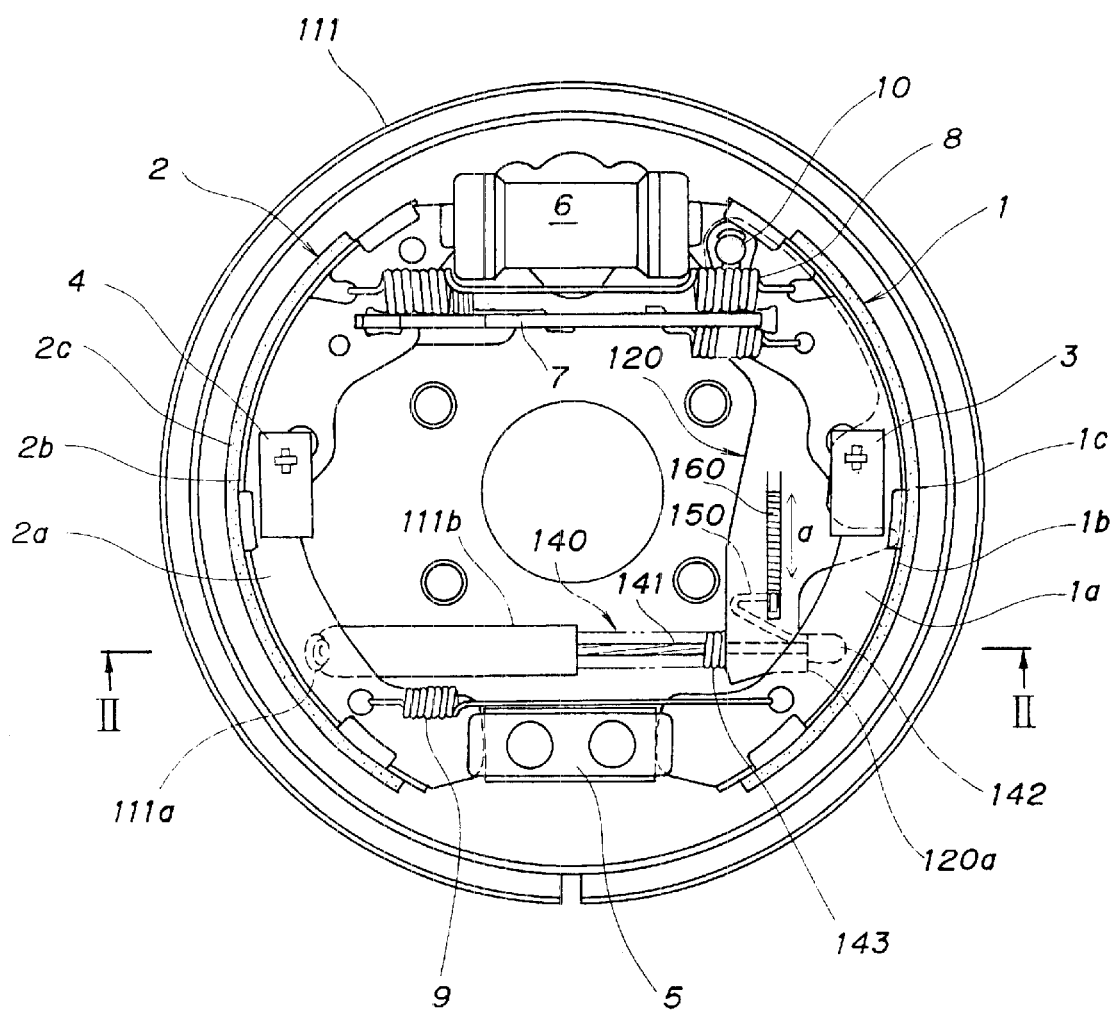
FIG. 1 is a plan view of a leading-trailing type drum brake including a brake cable connecting apparatus of the first example.
Figure 2:
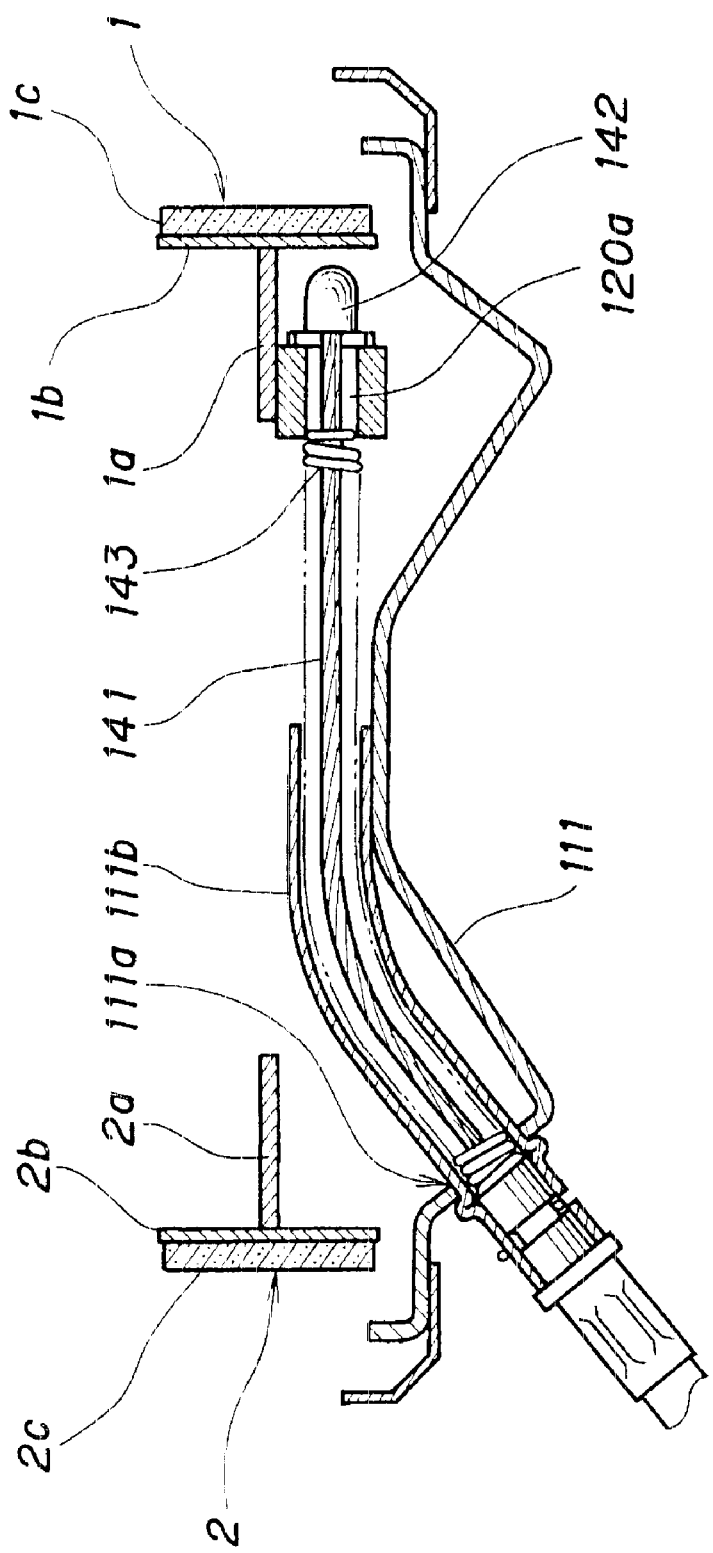
FIG. 2 is a cross-sectional view of FIG. 1 taken along the line II—II.
Figure 3:
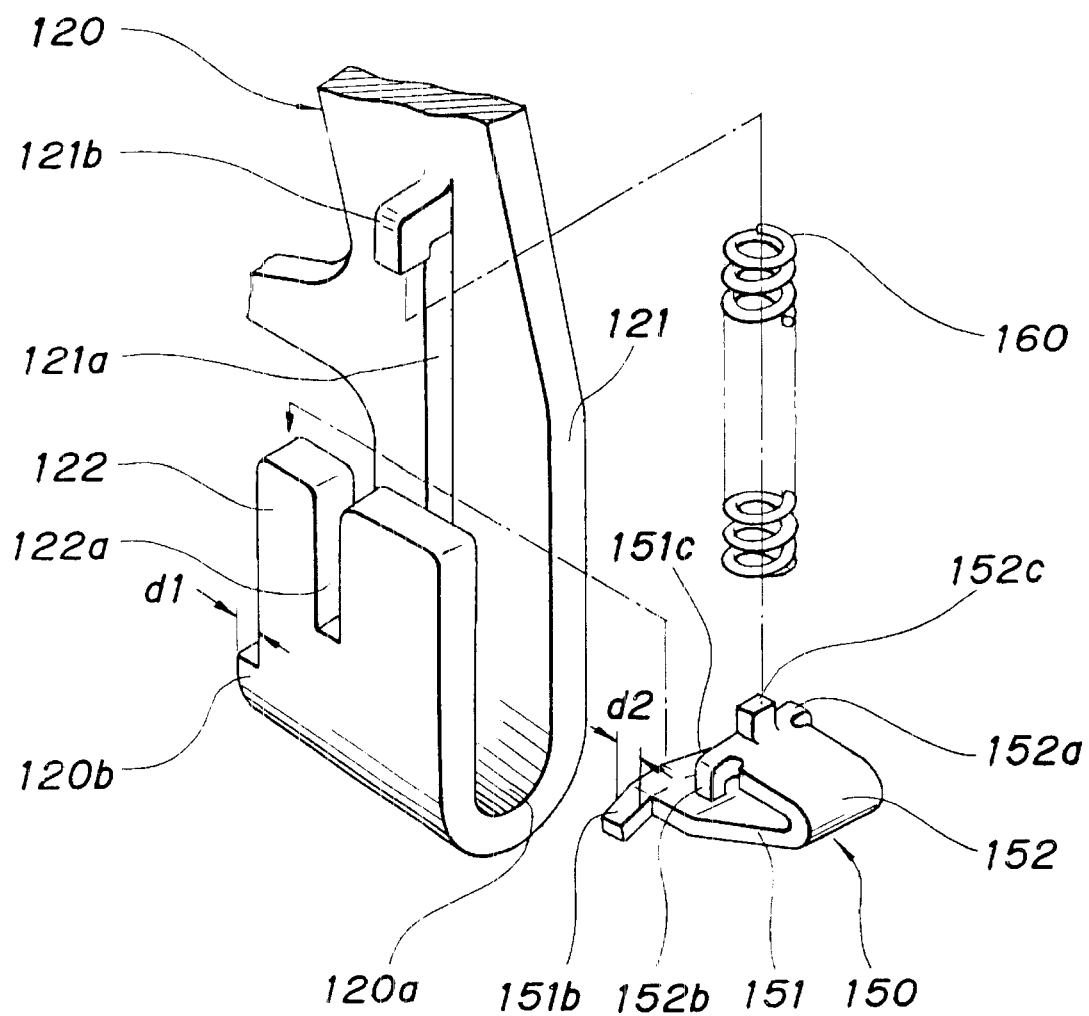
FIG. 3 is an exploded pictorial view of the brake lever constituting the brake cable connecting apparatus of the FIG. 1 when seen from a back plate side.
Figure 4:
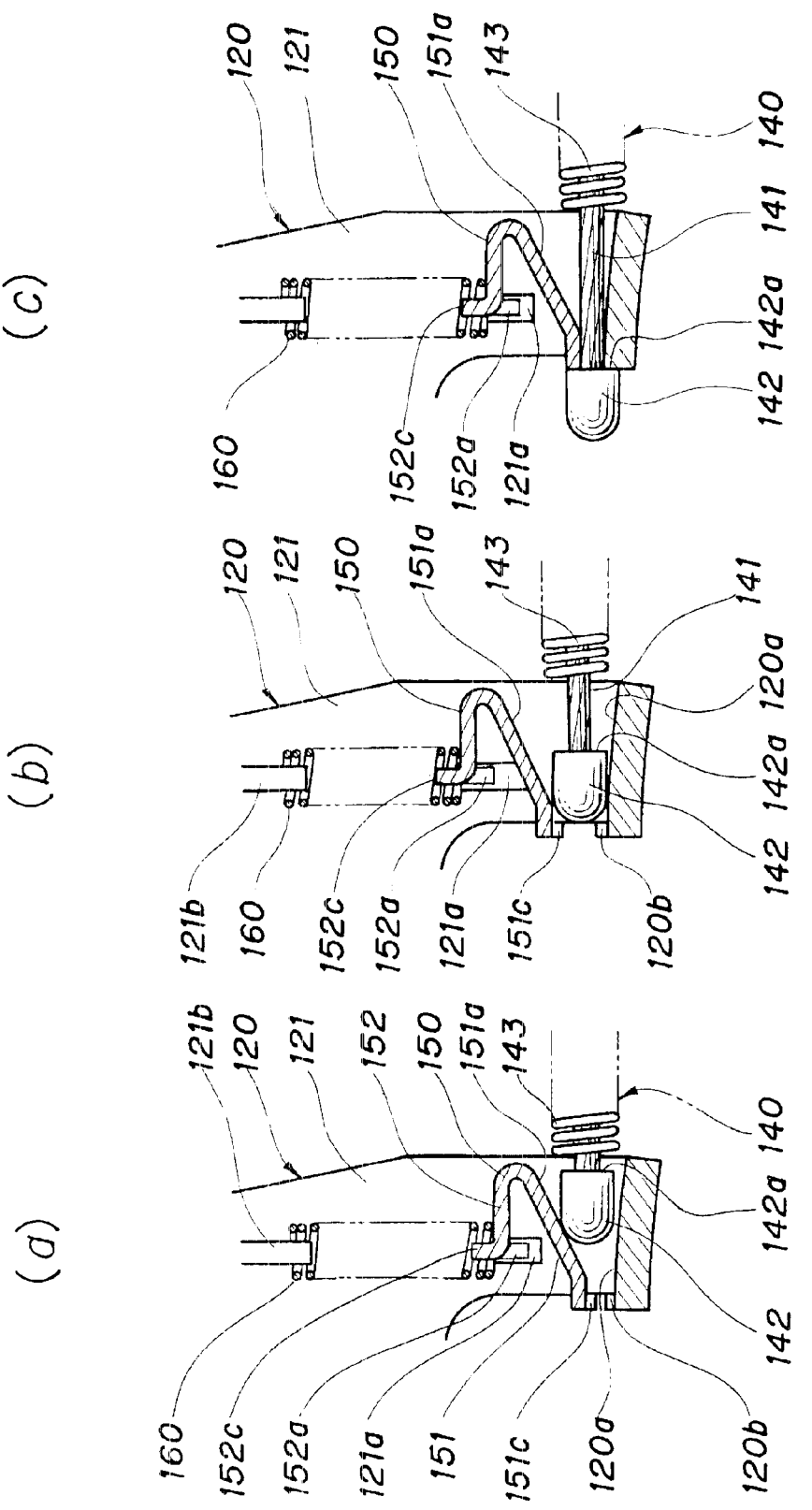
FIG. 4 is an explanatory view of the brake cable connecting procedure shown in the FIG. 1 when seen from the back plate side.

FIGS. 1–4 show a brake cable connecting apparatus as a first example of this invention; FIG. 1 is a plan view of a leading-trailing type (LT type) drum brake including this apparatus; FIG. 2 is a cross-sectional view of FIG. 1 taken along the line II—II; FIG. 3 is an exploded pictorial view of the brake lever constituting the brake cable connecting apparatus when seen from the back plate side; FIG. 4 is an explanatory view of the brake cable connecting procedure when seen from the back plate side. Almost all of the components of this drum brake are consistent with that of the prior art, therefore, the same reference numerals to the components of the prior art will also be used when describing the present invention; accordingly, different components and structures will be mainly explained with reference to the 100-series numerals.

A cable end insertion groove 120*a* is formed by U-like folding the free end of the brake lever 120. In FIG. 3, the right side of the insertion groove 120*a* is an entrance for the cable end 142 (a side of a cable pulling direction) and a left side thereof is an exit for the cable end 142 (a side of the cable releasing direction). A slit 121*a* of the brake lever 120 is positioned in the center of the width direction of the lever body 121. The slit 121*a* on the lever body 121 extends from an intermediate portion of the folding part to a portion above that of the opening of the insertion groove 120*a* in the vertical direction. A key-like projection 121*b* is formed at an upper end of the slit 121*a* by partial-shearing so as to project toward the side of the folded wall 122. In addition, a slot 122*a* is formed on the folded wall 122 in the center with respect to the width direction. The slot 122*a* is extends from an intermediate potion of the wall 122 to the tip end of the wall 122 in the vertical direction. The slit 121*a* and the slot 122*a* face each other. A tail 120*b* is formed at the cable exit side of the insertion groove 120*a*.

A guiding member 150 as a cable guiding means is made from a metal plate and folded in a J-like shape by press-working. The guiding member 150 comprises a long plate 151 and a short plate 152. Engaging projections 151*b*, 151*c*, projecting in the right and left direction with a width equal to that of the tail 120*b*, are formed at a tip end of the long plate 151 having a leading slope 151*a*.

Fitting projections 152*a*, 152*b* are formed on the right and left side of a tip end of the short plate 152 and project in right and left direction respectively and bend toward the long plate 151 at an intermediate portion of the fitting projections 152*a*, 152*b* in an L-shape. A projection 152*c* is provided at the center location between the two fitting projections 152*a*, 152*b* in the width direction of the short plate 152.

The procedure for attaching the guiding member 150 onto the cable end insertion groove 120*a* is described as follows: one fitting projection 152*a* of the guiding member 150 is fit in the slit 121*a;* the other fitting projection 152*b* is inserted into the opening of the slot 122*a* and shifted toward a bottom of the insertion groove 120*a;* and a coil spring 160 as a resiliently means is compressed between the key-like projection 121*b* of the brake lever 120 and the projection 152*c* of the guiding member 150 while both ends thereof are hooked on the both projections 121*b*, 152*c*. Therefore, the engaging projections 151*b*, 151*c* touch slightly on the tail 120*b* at the bottom of the insertion groove 120*a*. The guiding member 150 is now installed within the cable end insertion groove 120*a*. The guiding member 150 is able to move in the direction of the opening of the insertion groove 120a, across the axial direction of the cable 141 as shown by the arrow a in FIG. 1, and is biased toward the bottom of the insertion groove 120a by the coil spring 160. Accordingly, the fitting projection 152a, 152b are guideably supported by the slit 121a and the slot 122a respectively and the engaging projections 151b, 151c slide on the backward end surfaces at the exit side of the insertion groove 120a; thereby making the to-and-from motion of the guiding member 150 stable. As described above, the slit 121a, the slot 122a and the fitting projection 152a, 152b respectively fit in the slit 121a and the slot 122a, composing a guideably supporting means for guideably supporting the displacement of the guiding member 150 relative to the cable end insertion groove 120a in the cross-direction of the axis of the cable 141.

A curved tubular pipe 111b for use as a brake cable biasing means is fixed on an opening 111a of a back plate 111. The tubular pipe 111b is formed longer than the prior art conducting pipe 11b and functions to bias and guide the cable end 142 toward the entrance of the cable end insertion groove 120a, thereby omitting a pre-installed coil spring 31 on the brake necessary in the prior art. A coil spring 143, urging the brake lever 120 to an initial position, is wound around the cable 141 by method as is well-known in the art, and compressed between the cable end 142 and the end cap of the brake cable 140, thereby constituting the brake cable 140. The inner diameter of the tubular pipe 111b is specified as large as necessary for the coil spring 143 to pass through. The width of the insertion groove 120a is wider than that of the outer diameter of the cable end 142 but smaller than that of the outer diameter of the coil spring 143.

When the cable end 142 of the brake cable 140 is inserted into the tubular pipe 111b fixed at the opening 111a, the cable end 142 is biased and guided by the sufficiently long tubular pipe 111b; therefore the cable end 142 extrudes out an exit of the tubular pipe 111b and is advanced mostly straight resulting in contact with the leading slope 151a of the guiding member 150. Then, the cable end 142 is further advanced in the cable end insertion groove 120a while being led by the leading slope 151a as depicted in FIG. 4(a). The coil spring 143 is held at the entrance of the insertion groove 120a.

Further pushing the brake cable 140, the cable end 142 advances along the bottom of the cable end insertion groove 120a while pushing the leading slope 151a as depicted in FIGS. 4(a), 4(b), which results in lifting the guiding member 150 upward against the application force of the coil spring 160.

The guiding member 150 moves upward by guideably supporting the fitting projection 152a, 152b along the slit 121a and slot 122a of the brake lever 120 respectively, thereby moving in a direction away from the bottom surface of the cable end insertion groove 120a, i.e. an upward direction toward the upper opening of the cable end insertion groove 120a crossing the axial direction of the brake cable 140.

When the backward surface 142a of the cable end 142 exceeds the engaging projections 151b, 151c of the guiding member 150 at the side surface of the cable releasing direction and the tail 120b of the brake lever 120, the guiding member 150 immediately moves downward by the resilient force of the coil spring 160. Finally as shown in FIG. 4(c), the backward surface 142a of the cable end 142 engages with the engaging projections 151b, 151c and the tail 120b, thereby restricting the brake cable 140 from coming off from the insertion groove 120a. Because the height d1 of the tail 120b formed at the exit of the bottom of the insertion groove 120a is equal to the width d2 of the engaging projections 151b, 151c of the guiding member 150 in FIG. 3, the cable end 142 is held at the exit of the insertion groove 120a free from tilting and such. Afterward, the cable end 142 does not come off from the brake lever 120 even should the cable loosen.

End surfaces of the engaging projections 151b, 151c of the guiding member 150 abut the end surfaces of the exit of the groove 120a in the cable pulling direction; when considering that the guiding member 150 is substantially integrated with the brake lever 120, thereby being capable of withstanding an excessive pulling force. Accordingly, the body of the guiding member 150 and the coil spring 160, only having a function of automatically connecting the cable end 120 on the brake lever 120, can be compactly designed.

However, the engaging projections 151b, 151c and the tail 120b are not essentially required in this invention.

The above-described example shows a case that the guiding member 150 as a guiding means and the coil spring 160 as a resilient means are separately provided. Another embodiment provides a guiding member made of a plate spring and having a wave-shaped resilient part integrally formed therewith that is utilized to provide the combined function of the guiding means and the resilient means instead of the above-described separate parts.

The brake lever 120 and the guiding member 150 are made by press-working only without any machining process required, thereby reducing costs. The vertical displacement of the guiding member 150 is limited to the vertical length of the insertion groove 120a. The cable end 142 engages the engaging projection 151b, 151c of the guiding member 150 and the tail 120b of the brake lever 120 to prevent the cable end 140 from coming off from the brake lever 120 as soon as the cable end 140 passes the three portions 151b, 151c and 120b. Accordingly, it is not necessary to displace the cable end 142 further than the position for the usual engagement thereof, thereby preventing the cable end 140 from being caught between the brake lever 120 and the internal surface of the shoe rim, hence, affording design freedom. Further, the application of the plate spring to the guiding member 150 with an integrally forming resilient piece thereon is effective in reducing the number of the components.

Furthermore, an integration of the coil spring 143 onto the brake cable 140 is possible; therefore, the separate coil spring in the prior art is eliminated, thereby reducing costs associated with time consuming assembly.

Figure 5:
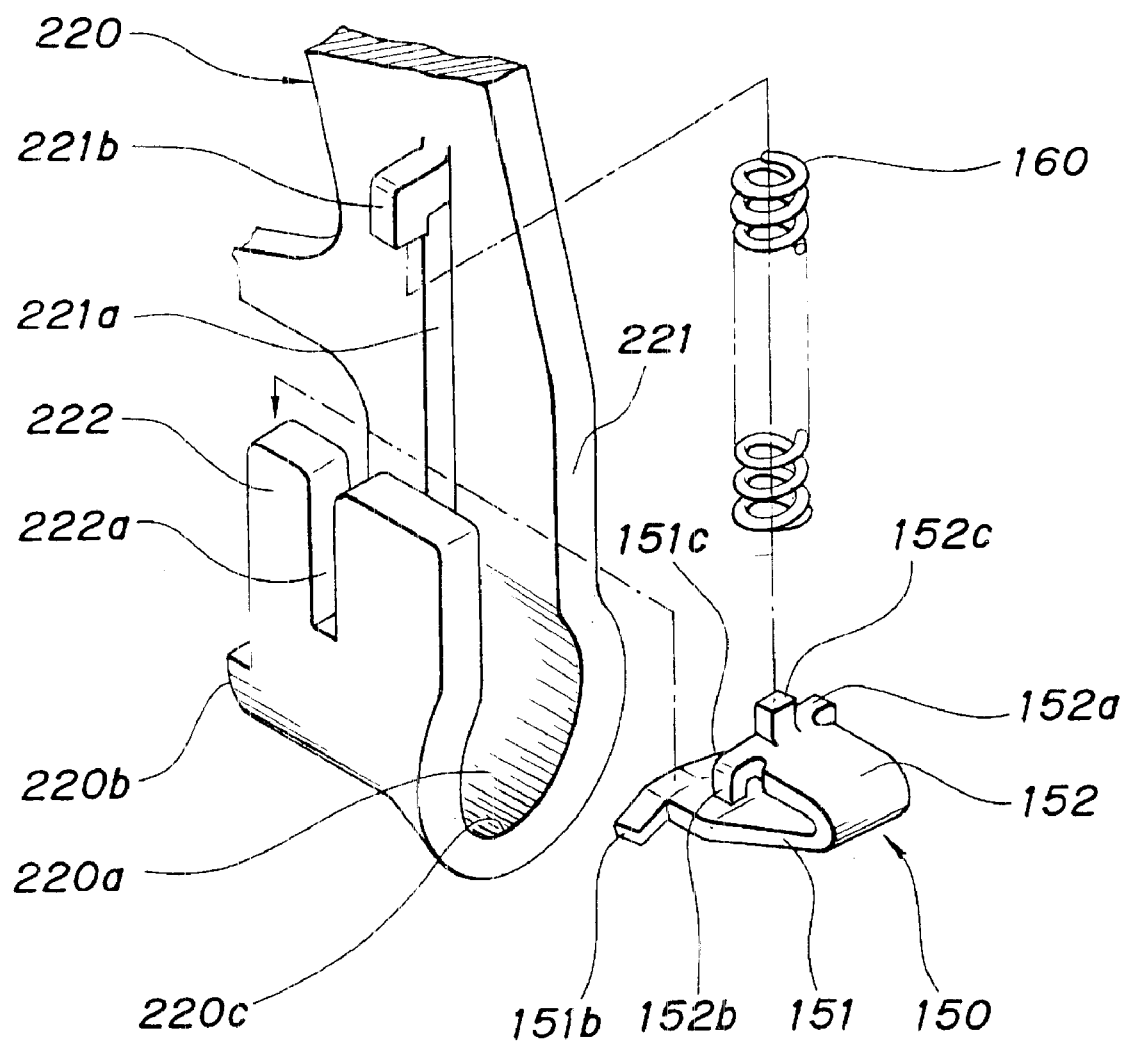
FIG. 5 is an exploded pictorial view of the brake lever constituting the brake cable connecting apparatus of the second example corresponding to FIG. 3 of the first example.
Figure 6:
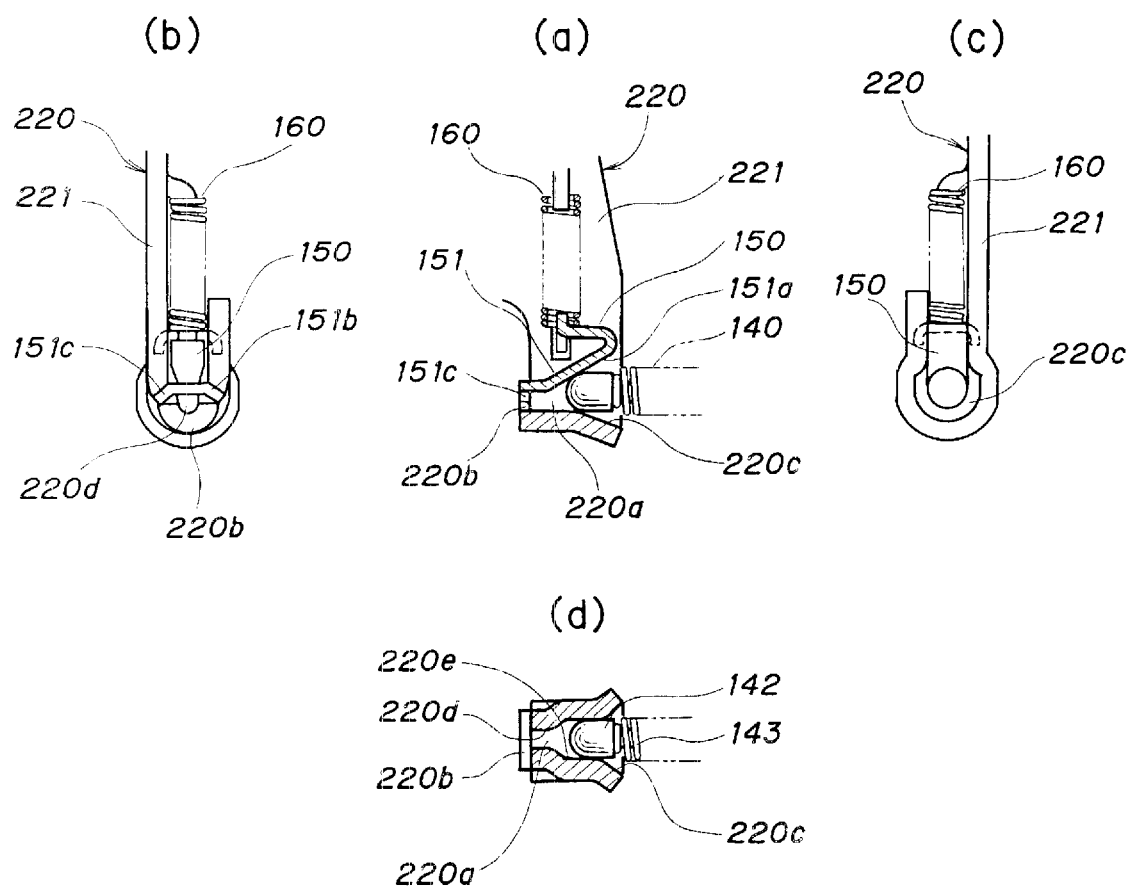
FIG. 6 is an explanatory view of the brake cable connecting procedure of the second example showing a condition where the cable end is just abutting against the guiding member.
Figure 7:
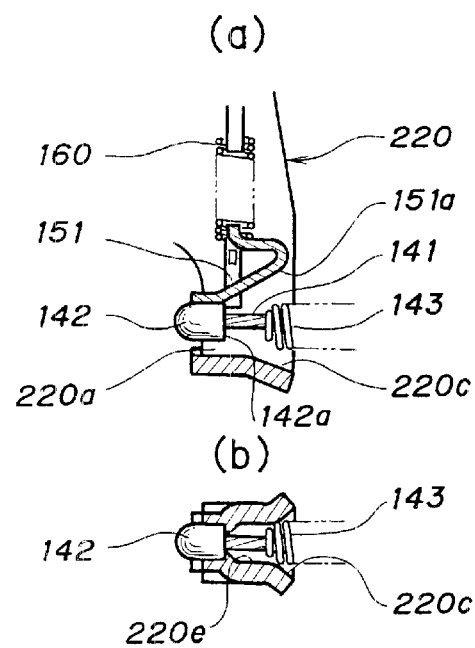
FIG. 7 is explanatory view of the brake cable connecting procedure of the second example showing a condition where the cable end passes through the brake lever while displacing the guiding member.
Figure 8:
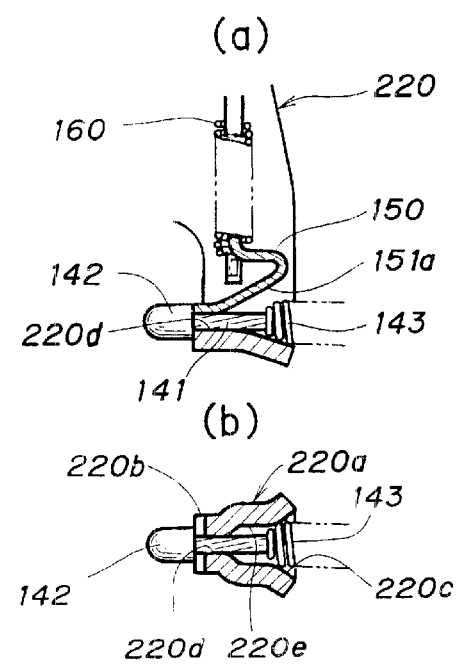
FIG. 8 is explanatory view of the brake cable connecting procedure of the second example showing a condition where the cable end engages with a surface in the cable releasing direction side after completely passing through the cable end.

FIGS. 5–8 show a second example of this invention; FIG. 5 is an exploded pictorial view of the brake lever constituting a brake cable connecting apparatus; FIGS. 6–8 are explanatory views of the brake cable connecting procedure; FIG. 6 shows the condition where the cable end is just abutting against the guiding member; FIG. 6(a) is a longitudinal section view; FIG. 6(b) is a left side view of FIG. 6(a); FIG. 6(c) is a right side view of FIG. 6(a); FIG. 6(d) is a cross section view of FIG. 6(a). FIGS. 7(a), (b) and FIGS. 8(a), (b) respectively correspond to FIGS. 6(a), (d). Here, FIG. 7 shows the condition where the cable end is passing the brake lever while displacing the guiding member and FIG. 8 shows the condition where the cable end engages with a surface in the cable releasing direction side after completely passing through the cable end. Further, a brake lever which is different from the first example will be only explained with reference to the 200-series numerals.

In this second example, a feature of the cable end insertion groove 220a of a brake lever 220 is characterized. That is, the cable end insertion groove 220a has a funnel-shaped leading slope 220c and a narrow groove 220d is only provided on the lower side thereof at the cable end exit side. Another portion of the groove 220a is an intermediate groove 220e which has a parallel opposed wall. The leading slope 220c is formed so that the width of the cable entrance side is larger than that of the diameter of the coil spring 143 and that the width of the cable exit side connecting to the intermediate groove 220e is as large as necessary to pass the cable end 142 but smaller than the diameter of the coil spring 143. The width of the narrow groove 220d is as large as necessary for retaining the cable 141 but is narrower than the diameter of the cable end 142.

A slit 221a and key-like projection 221b are formed at the side of the lever body 221 of the brake lever 220 similar to that of the first example shown in FIGS. 1–4 while a slot 222a is formed at the side of the folded portion 222 opposed to the lever body 221. The guiding member 150 and the coil spring 160 are the same as that in the first example.

When the brake cable 140, having the cable 141, the cable end 142 and the coil spring 143, is inserted from outside of the brake, the brake cable 140 passes through the curved tubular pipe 111b, then the cable end 142 is led to the intermediate groove 220e by sliding on the leading slope 151a and/or the leading slope 220c after abutting on one of those two slopes or both slopes as shown in FIG. 6(a)–FIG. 6(d). Further, the cable end 142 climbs on an upper portion of the narrow groove 220d. During the above-described process, the guiding member 150 stays on the upper side against an application force of the coil spring 160, thereby permitting the cable end 142 passing through.

The coil spring 143 advances with the cable end 142 in the initial stage but is retained at an intermediate portion of the leading slope 220c as shown in FIG. 7(b) because of the narrow width of the leading slope 220c.

The cable end 142 further advances in the intermediate groove 220e while sliding on the upper portion of the narrow groove 220d. As soon as the backward surface 142a of the cable end 142 passes the engaging projection 151b, 151c of the guiding member 150 and the tail 220b of the brake lever 220, the cable 141 fits into the narrow groove 220d and the backward surface 142a of the cable end 142 engages with the engaging projections 151b, 151c and the tail 220b by the resilient force of the coil spring 160 with the self restored force of the cable 141. Therefore the cable 141 will not come off from the cable end insertion groove 220a.

In this example, by providing the leading slope 220c at the entrance of the cable end insertion groove 220a, it is possible to lead the cable end 142 into the insert ion groove 220a accurately even If the cable end 142 may be fed into a slightly incorrect position. Further, by providing the narrow groove 220d, the cable 141 is retained and remains stable within the narrow groove 220d and the contact area of the backward surface 142a of the cable end 142 with the brake lever 220 can be increased, thereby enhancing the durability of the brake cable effectuating the proper engaging position of the cable end 142.

Figure 9:
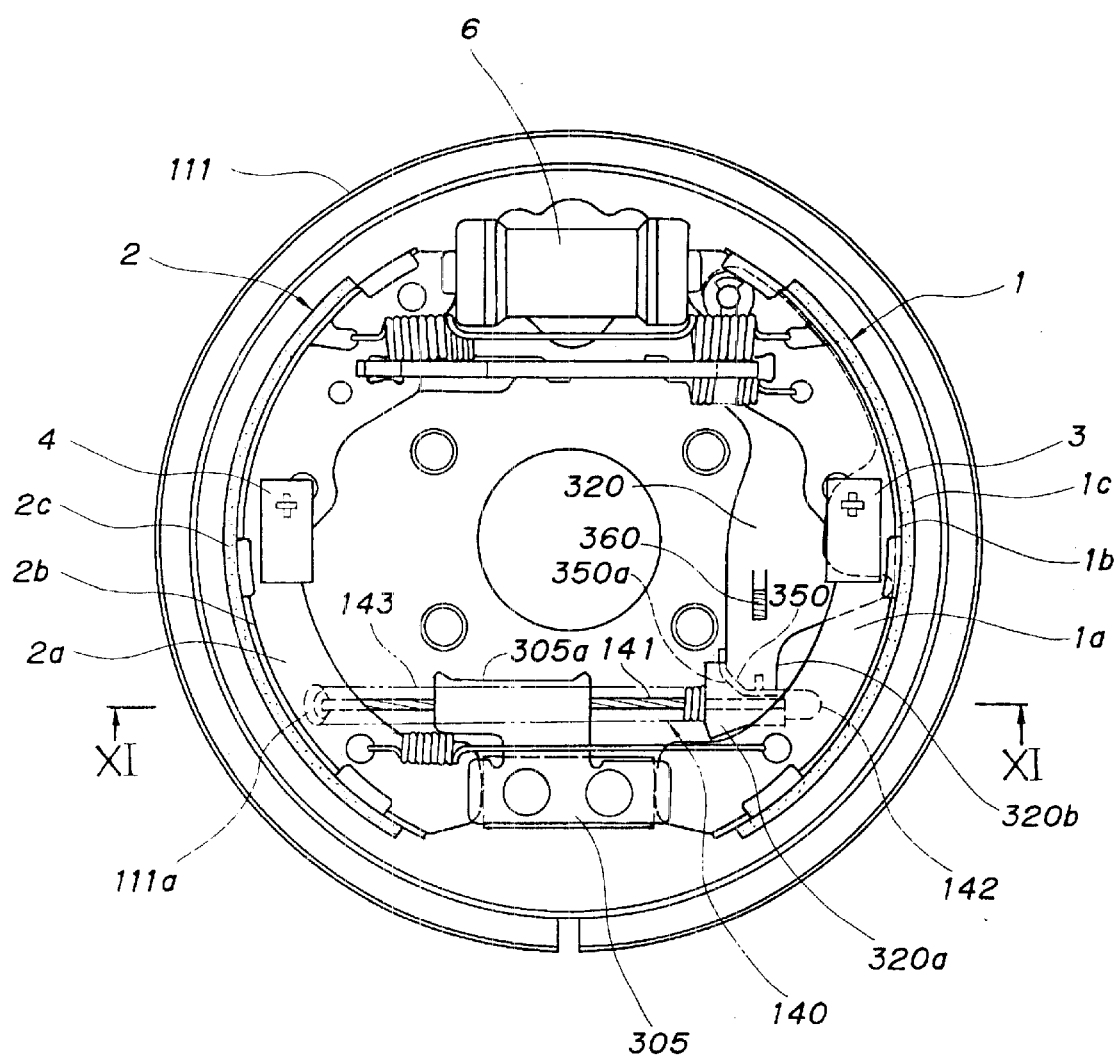
FIG. 9 is a plan view of a leading-trailing type drum brake including a brake cable connecting apparatus as described in the third example.
Figure 10:
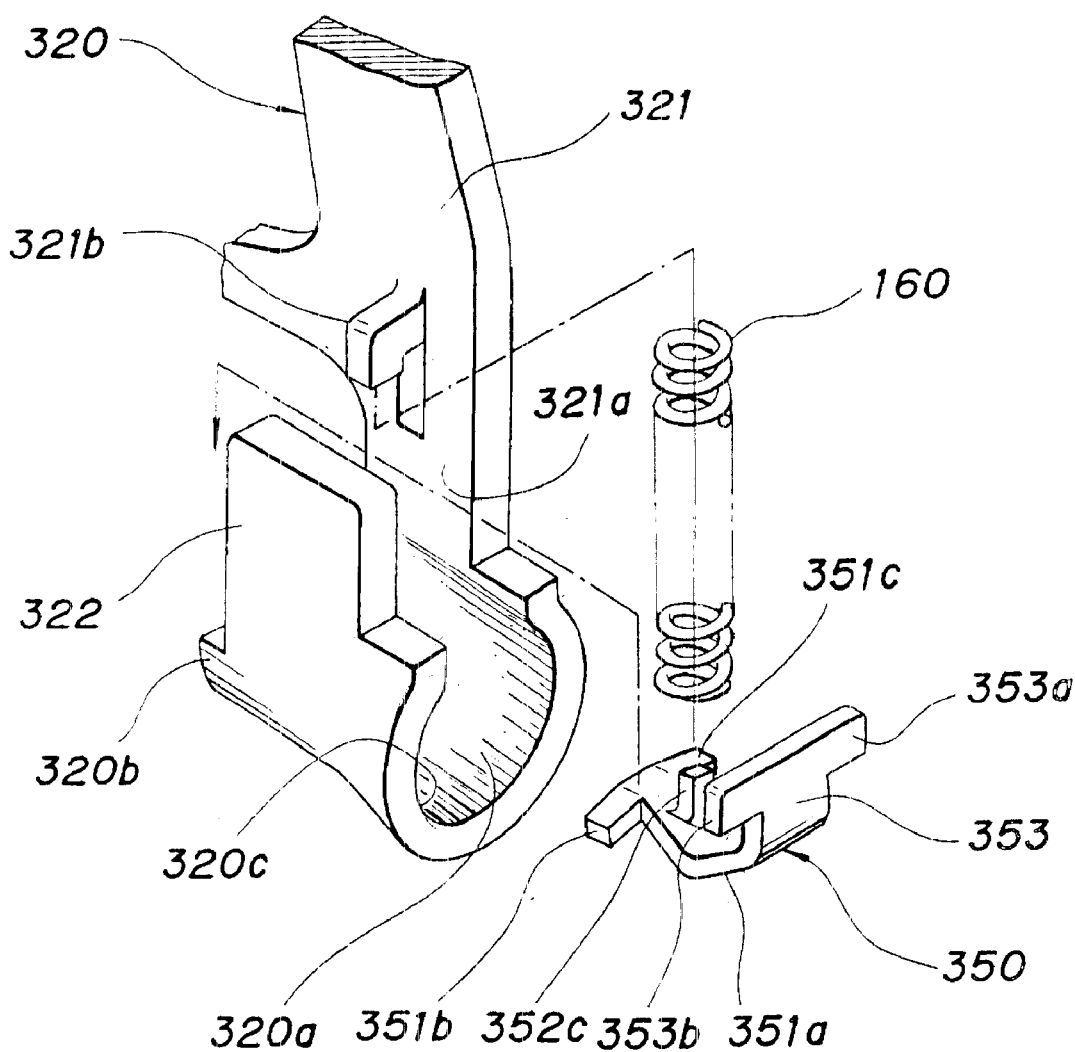
FIG. 10 is an exploded pictorial view of the brake lever constituting the brake cable connecting apparatus of FIG. 9 when seen from a back plate side.
Figure 11:
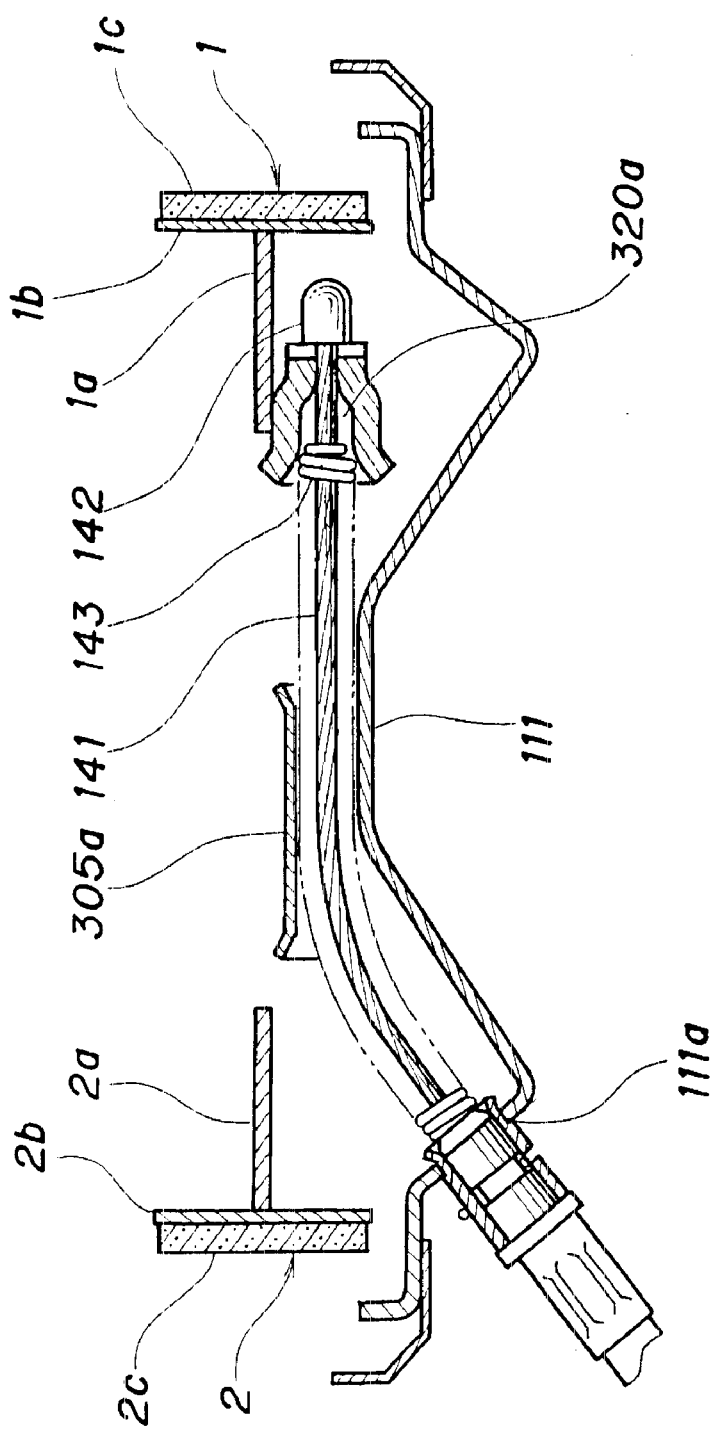
FIG. 11 is a cross-sectional view of FIG. 9 taken along the line XI—XI.
Figure 12:
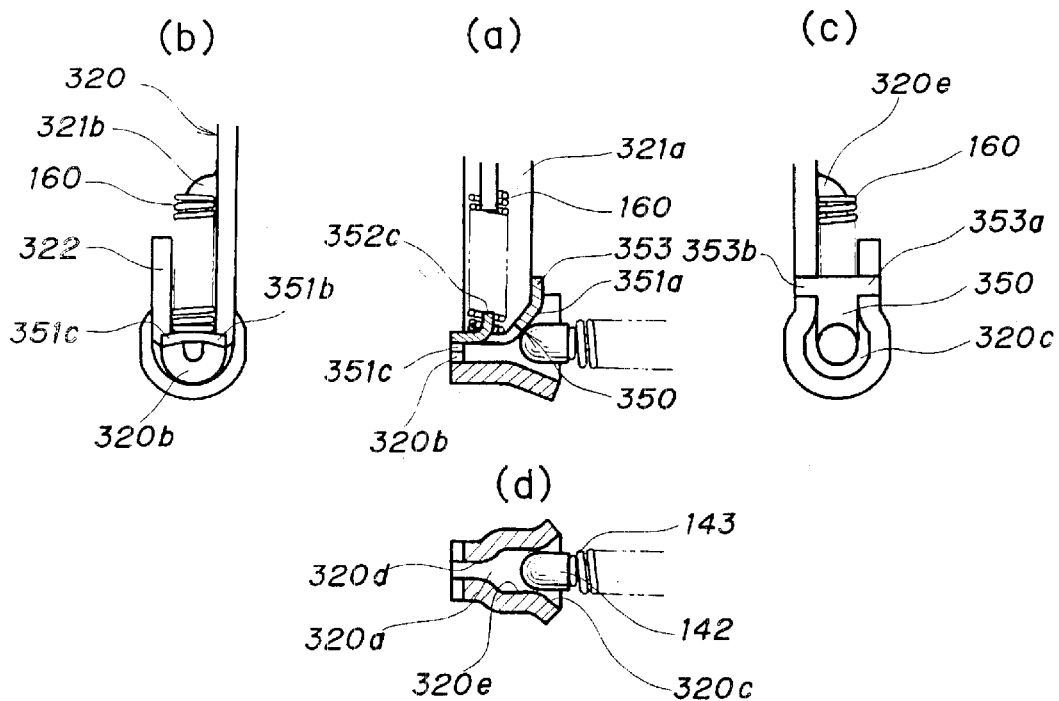
FIG. 12 is an explanatory view of the brake cable connecting procedure of the third example showing a condition where the cable end is just abutting against the guiding member.
Figure 13:
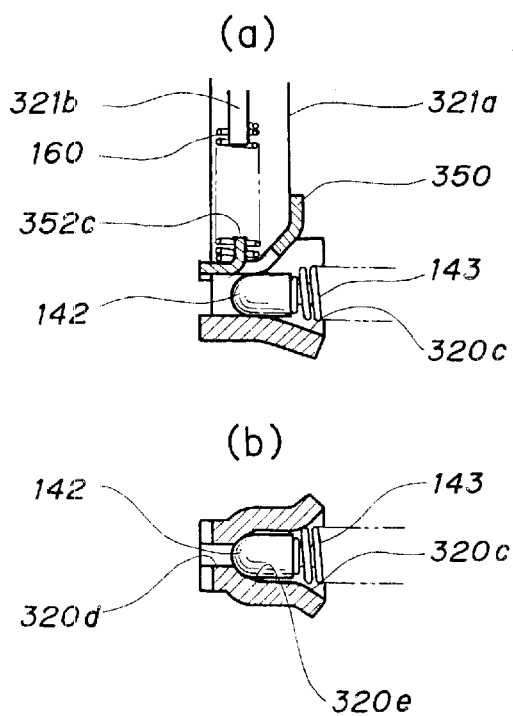
FIG. 13 is explanatory view of the brake cable connecting procedure of the third example showing a condition where the cable end is passing through the intermediate portion of the cable end insertion groove with displacement of the guiding member.
Figure 14:
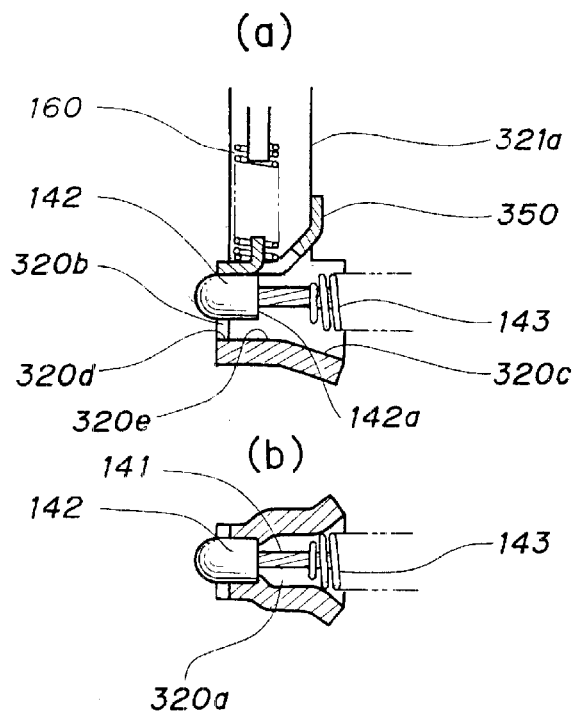
FIG. 14 is explanatory view of the brake cable connecting procedure of the third example showing a condition where the cable end, rising on a narrow groove of the cable end insertion groove, is passing above the narrow groove while displacing the guiding member.
Figure 15:
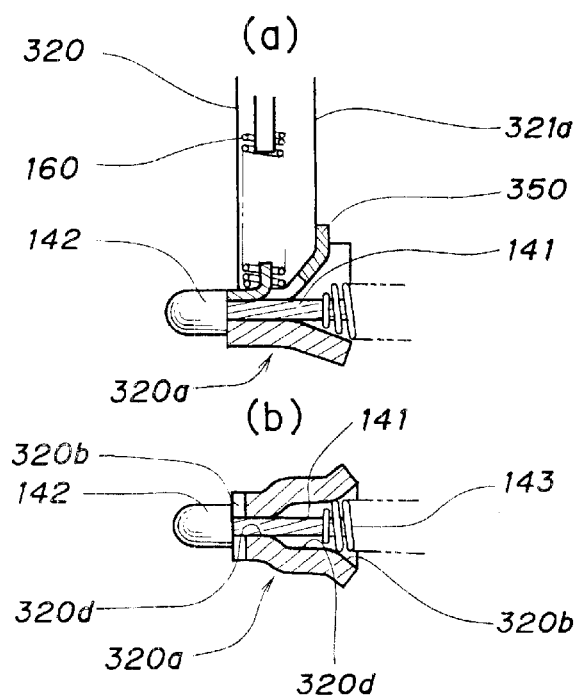
FIG. 15 is explanatory view of the brake cable connecting procedure of the third example showing a condition where the cable end engages with a surface in the cable releasing direction side after completing a passing of the cable end.
Figure 16:
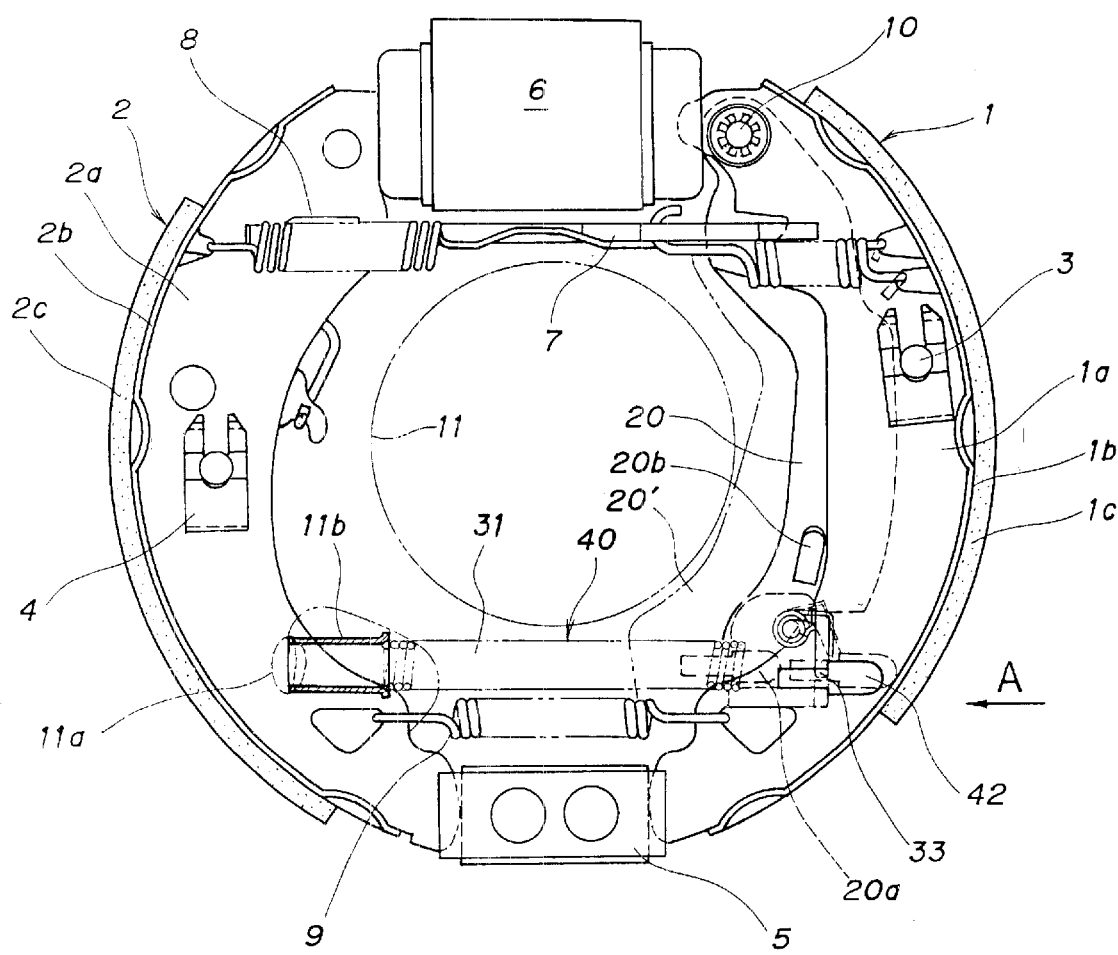
FIG. 16 is a plan view of a leading-trailing type drum brake including a brake cable connecting apparatus of the prior art.
Figure 17:
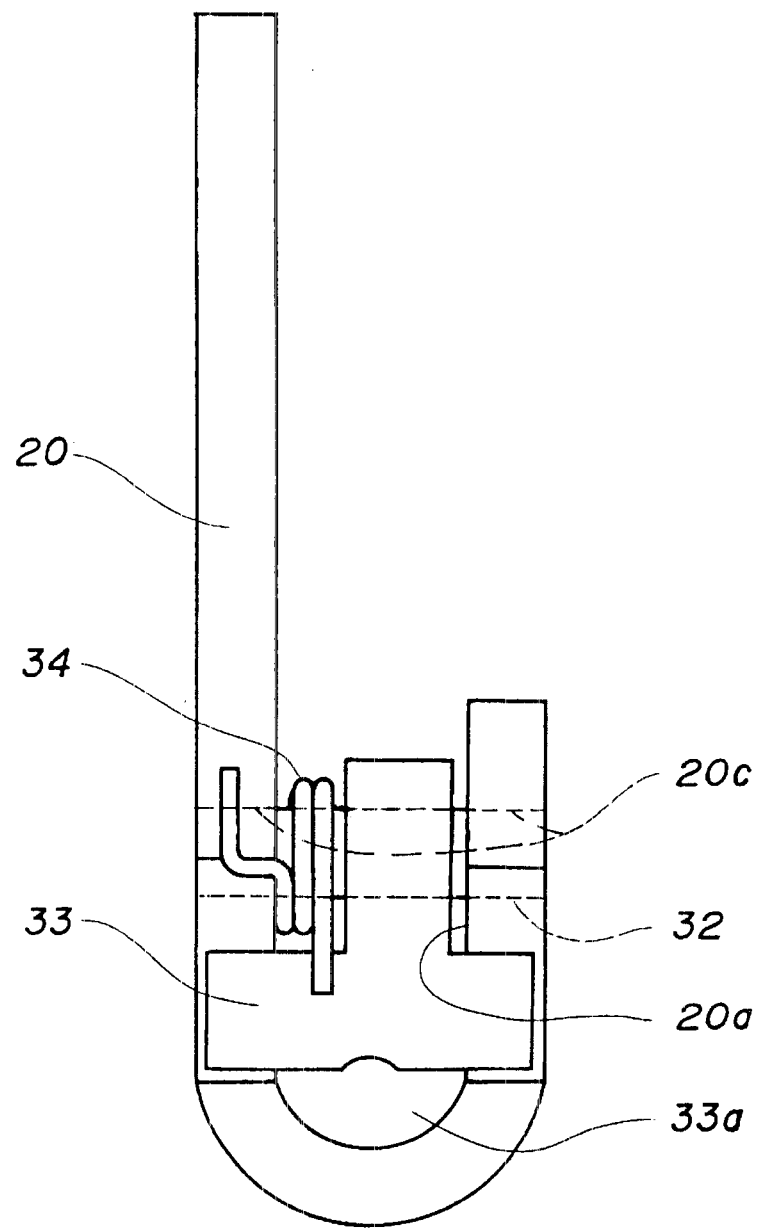
FIG. 17 is an enlarged view of the brake cable connecting apparatus of FIG. 16 when seen from the direction of arrow A.

FIGS. 9–15 show a third example of this invention; FIG. 9 is a plan view of a leading-trailing type drum brake device; FIG. 10 is an exploded pictorial view of the brake lever constituting the brake cable connecting apparatus of the FIG. 9 when seen from the back plate side; FIG. 11 is a cross-sectional view of FIG. 9 taken along the line XI—XI; FIGS. 12–15 are explanatory views of the brake cable connecting procedure. FIG. 12 shows a condition that the cable end is just abutting against the guiding member; FIG. 12(a) is a longitudinal section view; FIG. 12(b) is a left side view of FIG. 12(a); FIG. 12(c) is a right side view of FIG. 12(a); FIG. 12(d) is a cross section view of FIG. 12(a). FIGS. 13(a), (b), FIGS. 14(a), (b) and FIGS. 15(a), (b) correspond to FIGS. 12(a), (d) respectively. Here, FIGS. 13, 14 are showing conditions where the cable end passes through the brake lever while displacing the guiding member upward and FIG. 15 shows the condition where the cable end engages with a surface of the brake lever at a cable releasing direction side after completion of a passing through the guiding member. Further, a brake lever which differs from the first example will be only explained with reference to the 300-series numerals.

In this third example, the first feature of the brake cable biasing means is characterized. That is, the brake cable biasing means employs a tongue 305a, extending from the retaining plate 305 restricting the lifting of the brake shoes 1,2, rather than that of the curved tubular pipe 111b. The tongue 305a is curved in the form of a tip end as it approaches the back plate 111. The configuration of the tongue 305a and the back plate 111 hold the coil spring 143 around three fourths of its outer circumference. As a result, an intermediate portion of the brake cable 140 in the brake is kept slidably in a space formed between the tongue 305a and the back plate 111 in the parallel direction of the brake axis.

Herein, the second feature of the guiding member 350 and components therearound are characterized. The guiding member 350 is made of an I-like shaped plate and is formed in a right angle with a chamfering corner at the intermediate portion. The chamfering corner functions as the leading slope 351a. Left and right engaging projections 351b, 351c are projected at the left side of FIG. 11 in the same height that of the tail 320b formed at the exit end of the cable end insertion groove 320a. Right and left engaging projections 353a, 353b are projected at the tip end of the vertical guideably supporting part 353 at the entrance of the leading slope 351a. A projection 352c is projected parallel to the guideably supporting part 353 from the flat surface portion at the side of the engaging projections 353a, 353b. The width of the opposite side walls formed at the cable end insertion groove 320a is specified to be relatively narrow walls 321a in width in the range of the intermediate portion of the groove 320a in the depth direction and a key-like projection 321b of a lever body 321. Then engaging projections 351b, 351c and engaging projections 353a, 353b are slidably engaged with both end surfaces of the narrow walls 321a respectively. The way to install the guiding member 350 is to simply place it between the upper tip end of the folded side wall 322 and the projection 321b and then move it downward.

Finally the coil spring 160 is fit on and compressed between the projection 352c and the key-like projection 321b. In this example, the slits 121a, 221a and the slots 122a, 222a as described in the above examples 1 and 2 are not necessary and a feature of the cable end insertion groove 320a is similar to that of example 2.

A brake cable 140 connecting procedure for the third example is explained as follows. The brake cable 140 is inserted from outside of the brake as in examples 1 and 2; the cable end 142 abuts the tongue 305a of the retaining plate 305, thereby being biased toward the cable end insertion groove 320a. Later steps are explained according to FIGS. 12–15.

When the brake cable 140 passes through the tongue 305a as the biasing means and is further pushed, the cable end 142 abuts the leading slope 351a of the guiding member 350 and/or the leading slope 320c of the cable end insertion groove 320a, thereby going into the insertion groove 320a with the lead of the slope 351a, 320c as shown in FIGS. 12(a) and (b)

If the cable end 142 reaches the intermediate groove 320e of the cable end insertion groove 320a as shown in FIGS. 13(a) and (b), the guiding member 350 is pushed up against the application force of the coil spring 160 and the further advance of the coil spring 150 is obstructed. Upon pushing further, the cable end 142 climbs on the narrow groove 320d and pushes the guiding member 350 up further. Upon advancing moreover, when the cable end 142 passes through the engaging projection 351b, 351c of the guiding member 350 and the projection 320b at the bottom of the insertion groove 320a, the guiding member 350 immediately moves downward by the application force of the coil spring 160; therefore the cable end 142 engages with the brake lever 320 to restrict the cable end 142 to come off from the groove 320a as shown in FIG. 15. Afterwards, if the cable 141 is loosened, the cable end 142 never disengages from the brake lever 320.

In this example, an established retaining plate 305 is utilized as a brake cable biasing means, which results with a structure of the biasing means that is simplified and makes the brake device lighter. Further, the cable straightening force on the cable 141 during brake operation is supported by the back plate 111; therefore, the brake strength is improved. Furthermore, the slits 121a, 221a and the slots 122a, 222a are not necessary; therefore in addition to the effectiveness of the example 1 and 2, the brake lever 320 can be made in a simple process, that being less expensive and improving its strength.

This invention is not limited to examples 1–3, for example, the guiding means and biasing means as described in the example 1–3 may be changed respectively and this invention may then be applicable for publicly-known duo-servo type (DS type) drum brake device and so on.

As described above, the brake cable connecting device of this invention for a drum brake has the following advantages.

The cable end is latched at the position on the brake lever as soon as the backward surface of the cable end passes the guiding means and cable end insertion groove.

That is, no excess pushing of the cable end from the engaging position is necessary, thereby removing the usual anxiety that the cable end may get caught between the brake lever and the internal surface of the shoe rim. Furthermore, the guiding means is only required to move in the direction from the bottom of the cable end insertion groove to the opening of the cable end insertion groove, the production method of the brake lever and the guiding means is possible to be facilitated by press-working without the precision machining process.

Further, the guiding means and resilient means, e.g. the coil spring, are only installed on the brake lever, thereby reducing the number of components. In case the guiding means and the resilient means are integrally formed by a piece of the plate spring, the number of components is further reduced.

In case the cable releasing direction side of the guiding means abuts the cable releasing direction side of the brake lever and the backward surface of the cable end is supported by this abutting part and the backward surface of the cable end insertion groove, the cable pulling force is supported by the brake lever and guiding means is substantially integrated with the brake lever; therefore the guiding means is not required to be strong but has the function of a to-and-from motion, thereby simplifying the guiding means.

In case the leading slope is formed at the cable end entrance side of the guiding means, the movement of the guiding means in the direction toward the opening of the cable end insertion groove and across to the brake cable advancing direction becomes easier. Further, if a discrepancy exists between the cable end insertion position and the cable end insertion groove, the cable end is led to the correct position by the leading slope. Furthermore, in case the leading slope is formed at the cable end entrance side of the cable end insertion groove of the brake lever, the cable end is able to correctly advance to the cable end insertion groove. Still more, increasing the tolerance of the dimension by providing the leading means and guiding means, eases the production.

In case the coil spring is stretched and wrapped around the cable of the brake cable, the trouble of pre-installing the coil spring is saved, decreasing installation time; therefore the installing is improved. Further, in case the leading slope is provided on the guiding means and the size of the leading slope of the cable end insertion groove is larger than the diameter of the coil spring at the cable end entering side and also smaller than the diameter of the coil spring at the intermediate portion of the leading slope, the position of the coil spring steadies by steadying the stability of the coil spring.

In case the width of the cable end insertion groove at the exiting side and the bottom side of the cable end insertion groove is formed so that the cable is received and the cable end does not pass through and the cable end is obstructed to fall away from the brake lever after the cable end has passed, the cable of the brake cable would still be received with stability, by increasing the contacting area of the cable end; therefore the stability and the durability of the cable is improved.

In case the established retaining plate, restricting the lifting of the brake shoe, is utilized as a brake cable biasing means, biasing the brake cable toward the cable end insertion groove, the biasing means is simplified and lightened. Further, a component of a cable straightening force of the cable on the brake operation is supported by the back plate; therefore overall strength is improved and the brake device is lightened.

It is readily apparent that the above-described invention has the advantages of wide commercial utility. It may be understood that the specific form of the invention hereinabove described is intended to be representative only, and certain modifications within the scope of these teachings will be apparent to those skilled in the art without departing from the spirit and scope of the invention.

Accordingly, reference should be made to the following claims in determining the full scope of the invention.

What we claim is:

1. A brake cable connecting apparatus for a drum brake, said apparatus comprising:
   a brake lever for separating brake shoes apart, the brake lever having a cable end insertion groove for permitting a cable end of a brake cable to pass through, the cable end insertion groove being defined by a lever body and a folded wall at a free end thereof;
   a guiding means for guiding the cable end from an entrance of the cable end insertion groove to a position crossing an exit thereof so as to automatically latch the cable end on the brake lever; and a biasing means for flexibly biasing the brake cable inserted from outside of the drum brake toward the free end of the brake lever while deflecting the brake cable, wherein the guiding means is movably provided between the lever body and the folded wall of the brake lever in a direction toward an opening of the cable end insertion groove adjacent to a tip end of the folded wall or a cross-direction of the brake cable, upon the cable end being fed in a space surrounded by the cable end insertion groove and the guiding means, the guiding means slidably moves in the direction away from a bottom of the cable end insertion groove against an application force of a resilient means so as to permit the cable end to pass through the cable end insertion groove and reach the end surfaces of the guiding means and cable end insertion groove at a cable releasing direction side, the guiding means automatically returns by an action of the resilient means to a rest position so as to latch a backward surface of the cable end with the end surfaces of the cable end insertion groove and the guiding means at a side of a cable releasing direction or an exit side of the cable end insertion groove, thereby causing the brake cable to disengage from the brake lever.

2. The apparatus according to claim 1, wherein an engaging project ion formed on the guiding means at the side of the cable releasing direction abuts an end surface of the brake lever at the side of the cable releasing direction.

3. The apparatus according to claim 1, wherein a leading slope, for leading the cable end, is formed on the guiding means at the side of a cable pulling direction.

4. The apparatus according to claim 1, wherein a leading slope, for leading the cable end, is formed on the cable end insertion groove of the brake lever at the side of a cable pulling direction.

5. The apparatus according to claim 1, wherein the brake cable includes a coil spring wound around a cable of the brake cable and compressed against the cable end and the cable end insertion groove at the side of the cable pulling direction is formed to permit the cable end to pass through and to obstruct the coil spring from passing through.

6. The apparatus according to claim 1, wherein the bottom portion of the cable end insertion groove at the side of the cable releasing direction is formed to receive the cable of the brake cable and to obstruct the cable end from passing through.

7. The apparatus according to claim 1, wherein the biasing means is formed as a tail extending from a retaining plate, where the retaining plate restricts lifting of the brake shoe.

8. The apparatus according to claim 7, wherein a cable straightening force on the cable during brake operation is supported by a back plate and a space, for guiding the brake cable, is formed with the tail and the back plate.

* * * * *